United States Patent Office 3,203,920
Patented Aug. 31, 1965

3,203,920
CURABLE MIXTURES CONTAINING EPOXY RESINS, CURING AGENTS AND FLEXIBILIZERS
Erwin Nikles, Allschwil, Otto Ernst,, Pfeffingen, Hans Batzer, Arlesheim, and Kurt Brugger, Munchenstein, Switzerland, assignors to Ciba Limited, Basel, Switzerland, a company of Switzerland
No Drawing. Filed Nov. 19, 1962, Ser. No. 238,721
Claims priority, application Switzerland, Nov. 20, 1961, 13,478/61
4 Claims. (Cl. 260—30.4)

It is known to add to epoxy resins during their curing compounds that render the cured products flexible. Such known flexibilizers for epoxy resins are, for example, polyamides from dimerised unsaturated higher fatty acids and polyalkylene polyamines ("Versamids"), also polyalkylene glycols such as polyethylene glycols and polypropylene glycols.

These known flexibilizers are, however, at room temperature relatively highly viscous which is a considerable inconvenience for many uses of the curable epoxy resin mixtures, e.g. as casting or laminating resins or as lacquer systems that are free from solvents.

It has now surprisingly been found that certain lactones containing at least 6 carbon atoms, such as caprolactone, are extremely useful flexibilizers for epoxy resins

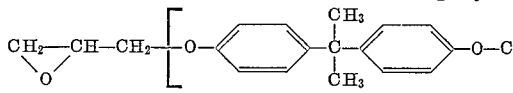

and have at the same time a desirably low viscosity at room temperature. Moreover, after curing the products display in general a much higher ultimate elongation than do products cured under identical conditions but together with known flexibilizers.

Accordingly, the present invention provides curable mixtures of 1:2-epoxy compounds having a 1:2-epoxide equivalence greater than 1, a curing agent for such epoxy compounds, and a flexibilizer, the flexibilizer used being a lactone of the general formula (I)
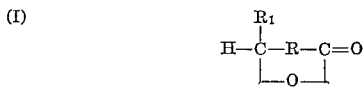

in which R represents either a lineaer alkylene radical or one that contains methyl groups as side chains and comprises at least 4 carbon atoms, preferably 4 to 10 carbon atoms, and $R_1$ represents a hydrogen atom or a lower alkyl group with 1 to 4 carbon atoms.

The invention further provides a process for curing 1:2-epoxy compounds having an epoxide equivalence greater than 1, in the presence of a curing agent and of a flexibilizer, the flexibilizer used corresponding to the above Formula I.

As examples of lactones of the formula (I) there may be mentioned: β-methyl-ε-caprolactone, γ-methyl-ε-caprolactone, δ-methyl-ε-caprolactotne, ε-methyl-ε-caprolactone, β:δ-dimethyl-ε-caprolactone, octanolide-(8:1), dodecanolide-(12:1) and more especially ε-caprolactone (=hexanolide).

The 1:2-epoxy compounds having an epoxide equivalenec greater than 1, used as starting materials, contain n groups of the formula

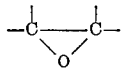

calculated from the average molecular weight, n being a whole or fractional number greater than 1. The 1:2-epoxide groups may be in terminal or inner positions. Particularly useful terminal 1:2-epoxide groups are 1:2-epoxyethyl and 1:2-epoxypropyl groups. Preference is given to 1:2-epoxy-propyl groups linked with an oxygen atom, that is to say glycidyl ether or glycidyl ester groups. Compounds with inner epoxide groups contain at least one 1:2-epoxide group present in an aliphatic chain

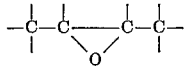

or attached to a cycloaliphatic ring.

Suitable polyglycidyl ethers are the known compounds obtained by the alkaline condensation of epichlorohydrin with polyols. Polyols suitable for use in the present invention are polyalcohols, such as ethylene glycol, 1:4-butanediol or polyalkylene glycols, and more especially polyphenols such as phenol novolaks or cresol novolaks, resorcinol, pyrocatechol, hydroquinone, 1:4-dihydroxynaphthalene, bis-[4-hydroxyphenoyl]-methyl-phenylmethane, methyl-phenylmethane, bis-[4-hydroxyphenyl]-tolylmethane, 4:4'-dihydroxydiphenyl, bis-[4-hydroxyphenyl]-sulfone and more especially 4:4'-dihydroxydiphenyl-dimethyl-methane (=bisphenol A).

Polyglcidyl ethers suitable for use in the present invention correspond to the average formula

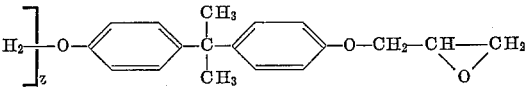

in which Z represents a whole number from 0 to 6. Diglycidyl ethers of bisphenol A, that are liquid at room temperature, contain about 4.8 to 5.6 epoxide equivalents per kg. Further suitable are higher polyglycidyl ethers which are solid at room temperature and contain about 0.5 to 3.5 epoxide equivalents per kg.

There are also suitable polyglycidyl esters such as are obtained by reacting a dicarboxylic acid with epichlorohydrin or dichlorohydrin in the presence of an alkali. Such polyesters may be derived from aliphatic dicarboxylic acids, such as oxalic acid, succinic acid, glutaric acid, adipic acid, pimelic acid, suberic acid, azelaic acid, sebacic acid, or preferably from aromatic dicarboxylic acids such as phthalic acid, isophthalic acid, terephthalic acid, 2:6-naphthalene-dicarboxylic acid, diphenyl-ortho'-dicarboxylic acid, ethylene-glycol-bis-(para-carboxyphenyl)-ether or the like. As examples there may be mentioned diglycidyl adipate and diglycidyl phthalate as well as diglcidyl esters of the average formula

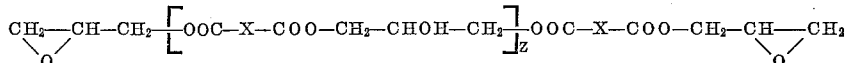

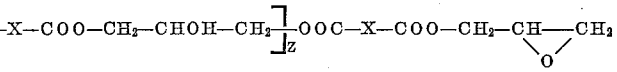

in which X represents an aromatic hydrocarbon radical, such as a phenylene radical, and Z represents a small whole or fractional number.

As epoxy compounds containing an inner 1:2-epoxide group there are suitable epoxidized diolefines, dienes or cyclic dienes, such as 1:2:5:6-diepoxyhexane, 1:2:4:5-diepoxycyclohexane, dicyclopentadiene diepoxide, dipentene diepoxide and more especially vinylcyclohexene diepoxide; epoxidized diolefinically unsaturated carboxylic acid esters such as methyl-9:10:12:13-diepoxy stearate, and the dimethyl ester of 6:7:10:11-diepoxyhexadecane-1:16-dicarboxylic acid. Furthermore, there may be mentioned epoxidized monoethers, diethers and polyethers, monoesters, diesters and polyesters, and monoacetals, diacetals and ployacetals containing at least one cycloaliphatic 5-membered or 6-membered ring to which compounds are those corresponding to the following at least one 1:2-epoxide group is attached Suitable Formulae II to XIII:

(II) 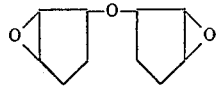

(III) 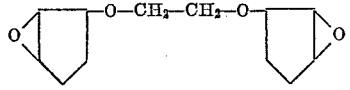

IV) 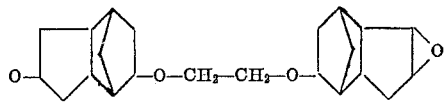

(V) 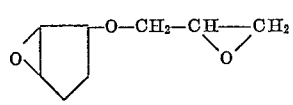

(VI) 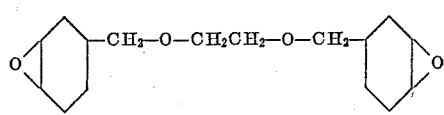

(VII) 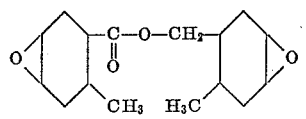

(VIII) 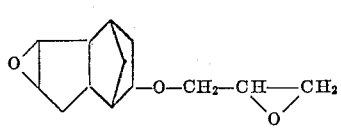

(IX) 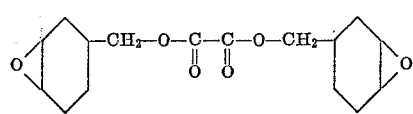

(X) 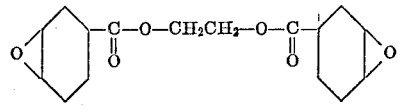

(XI) 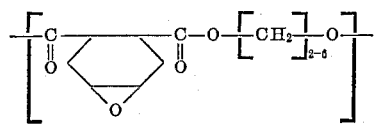

(XII) 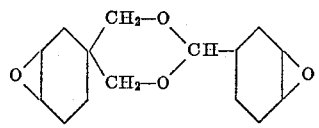

(XIII) 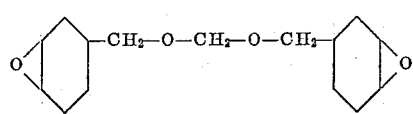

Further suitable compounds containing an inner 1:2-epoxide group are epoxidized diolefine polymers, more especially polymers of butadiene or cyclopentadiene and epoxidized fatty acids, fatty oils and fatty esters. Preferred butadiene polymers are epoxidized copolymers and the adducts with styrene, acrylonitrile, toluene or xylene.

Flame-inhibiting properties of the cured resins are achieved by starting from 1:2-epoxy compounds that further contain a halogen, above all chlorine or bromine. As such halogen-containing epoxy compounds there may be mentioned, for example, digylcidyl ethers of chlorinated bisphenols, 2:3-dichloro-1:4-butanediol digylcidyl ether, 2:3-dibromo-1:4-butanediol digylcidyl ether, 2:2:3:3-tetrachloro-1:4-butanediol digylcidyl ether; also compounds of the following Formulae XIV to XVII:

(XIV) 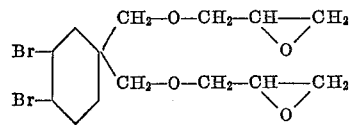

(XV) 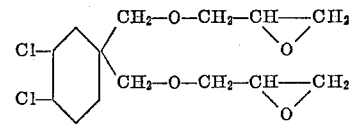

(XVI) 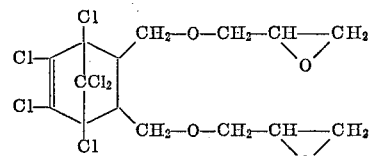

(XVII) 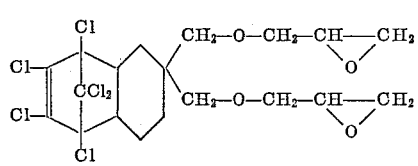

Either basic or acidic compounds may be used for curing the 1:2-epoxy compounds. Particularly good results have been obtained with amines and amides, such as aliphatic or aromatic primary, secondary or tertiary amines, for example mono-, di- and tri-butylamines, para-phenylenediamine, 4:4-diaminodiphenylmethane, ethylene-diamine, N-hydroxyethyl-ethylene-diamine, N:N-diethyl-ethylenediamine, diethylene-triamine, meta-xylylenediamine, triethylene-tetramine, trimethylamine, diethylamine, triethanolamine, Mannich's bases, piperidine, piperazine, guanidine and guanidine derivatives such as phenyldiguanidine, diphenylguanidine, dicyandiamide, urea-formaldehyde resins, aniline-formaldehyde resins; polymers of aminostyrenes; polyamides, for instance those from dimerized or trimerized unsaturated fatty acids with alkylenepolyamines; isocyanates, isothiocyanates; phosphoric acid, polybasic carboxylic acids and their anhydrides, for example, phthalic anhydride, methyl-endomethylene tetrahydrophthalic anhydride, dodecenylsuccinic anhydride, hexahydrophthalic anhydride, hexachloro-endomethylene tetrahydrophthalic anhydride or endomethylenetetrahydrophthalic anhydride or mixtures thereof; maleic or succinic anhydride, polyphenols, for instance resorcinol, hydroquinone, quinone, phenolaldehyde resins, oil-modified phenolaldehyde resins, reaction products of alcoholates or phenolates with tautomeric compounds of the type of acetoacetic ester; Friedel-Crafts catalysts, such as $AlCl_3$, $SbCl_5$, $SnCl_4$, $FeCl_3$, $ZnCl_2$ or $BF_3$ or their complexes with organic compounds; metal fluoborates, such as nickel fluoborate, and boroxines such as trimethoxyboroxine.

The term "curing" as used in this context signifies the conversion of the 1:2-epoxy compounds into insoluble and infusible resins.

The curable mixtures of the invention may also be admixed at any stage of the process before the curing operation with fillers, active diluents such as butyl-glycide, cresylglycide or 3:4-epoxy-tetrahydrodicyclo-pentadienol-8; with plasticisers such as dibutyl phthalate or tricresyl phosphate; pigments, dyestuffs, flame-inhibiting substances, mould separating agents or the like. Suitable extenders and fillers are, for example, asbestos, asphalt, bitumen, cellulose, glass fibers, mica, quartz meal, magnesium carbonate, kaolin, ground chalk, ground slate, colloidal silicon dioxide having a large specific surface ("Aerosil") or metal powders.

The curable mixtures of epoxy compounds, curing agents and lactones may be used in the presence or absence of a filler, if desired in the form of solutions or emulsions, as textile assistants, impregnating resins, laminating resins, paints, lacquers, dipping resins, casting resins, coating compositions, pore-fillers, putties, floor coverings, adhesives, moulding compositions, insulating compounds for the electrical industry and the like, as well as for the manufacture of such products.

British specification No. 878,750 disclosed mixtures, which are suitable for curing at room temperature, of epoxy resins, aromatic diamines and γ-butyrolactone as active diluent. Such mixtures of epoxy resin, polyamine and butyrolactone are suitable, for example, as surface protecting agents but they have the disadvantage that the films are considerably turbid and that, moreover, they take a relatively long time until they are dust-dry. On the other hand, the mixtures of the invention consisting of epoxy resin, polyamine and ε-caprolactone offer the astonishing technical advantage that they form clear films and become dust-dry in a considerably shorter time.

In the following examples parts and percentages are by weight and the relationship between part by weight and part by volume is the same as between the kilogram and the liter.

EXAMPLE 1

100 parts each of an epoxy resin (=resin A) which is liquid at room temperature and has been prepared in known manner by reacting bis-(4-hydroxyphenyl)-dimethylmethane with epichlorohydrin in the presence of alkali, containing 5.3 epoxide equivalent per kg. are mixed at room temperature as follows:

Specimen 1 with 30 parts of polypropylene gylcol having an average molecular weight of 425,
Specimen 2 with 50 parts of a polyamide resin obtained by condensing dimerized unsaturated vegetable fatty acids with diethylene triamine, marketed under the trade mark "Versamid 140" and
Specimen 3 with 20 parts of ε-caprolactone.

Each specimen is further admixed at room temperature with 10 parts of triethylene tetramine as curing agent.

Of each casting resin specimen thus obtained the initial viscosity and the pot life up to the point where 3000 centipoises are reached (upper limit of castability of the resin without developing air bubbles, without applying a vacuum) are determined in the Hoppler viscosimeter at 25° C. To measure the ultimate elongation, each specimen is cast at room temperature in the aluminum moulds described in the VSM Standard Specification 77101 and cured for 14 hours at 40° C.

| Specimen | Viscosity of casting resin mixture at 25°C. in centipoises | Pot life of casting resin mixture up to 3,000 centipoises in minutes | Ultimate elongation of the cured casting resin mixtures in percent |
|---|---|---|---|
| 1 | 1,100 | 65 | 29 |
| 2 | 3,000 | 0 | 1.7 |
| 3 | 530 | 85 | 65 |

EXAMPLE 2

Clear lacquers are prepared by mixing an epoxy resin which is liquid at room temperature (accessible by condensing 1 mol of bis-[para-hydroxyphenyl]-dimethylmethane with at least 2 mols of epichlorohydrin in the presence of aqueous sodium hydroxide solution) containing 5.2 epoxide equivalent per kg. and having a viscosity of about 12,000 centipoises at 20° C. (=resin A) with a curing agent consisting of 3 parts of triethylene tetramine and 1 part of tris(dimethylaminomethyl)phenol (=curing agent B), with a leveling agent of the following composition (=levelling agent C):

|  | Parts |
|---|---|
| Ethylcellulose of low viscosity | 6 |
| 80% solution in n-butanol of n-butylated hexamethyl amine | 20 |
| Toluene | 10 |
| Diacetone alcohol | 14 |
| Pine oil | 50 |
|  | 100 | and further with ε-caprolactone, in the proportions shown in the following table. The clear lacquers are applied with the aid of a lacquer coating device to plates of glass. The lacquer films are then dried and/or cured under the conditions listed in the following table, and the dust-drying times are measured. Furthermore, the transparency of the cured films produced on the plates of glass is examined.

In a second and a third test series the procedure is exactly as described above, except that ε-caprolactone is replaced by an equal amount of the known plasticizer dibutyl phthalate or of the γ-butyrolactone described in British specification No. 878,750 used as active diluent for curable resin mixtures.

The results are compiled in the following table in which also the pot life of the curable clear lacquers is shown.

Table

| Specimen No. | 1 | 2 | 3 | 4 | 5 | 6 |
|---|---|---|---|---|---|---|
| Resin A (parts) | 80 | 90 | 80 | 90 | 80 | 90 |
| Curing agent B (parts) | 9.6 | 10.8 | 9.6 | 10.8 | 9.6 | 10.8 |
| Levelling agent C (parts) | 2 | 2 | 2 | 2 | 2 | 2 |
| ε-caprolactone | 20 | 10 |  |  |  |  |
| Dibutyl phthalate |  |  | 20 | 10 |  |  |
| γ-butyrolactone |  |  |  |  | 20 | 10 |
| Pot life at 20°C., in hours (100 g. in aluminum mould, 7 cm. dia., 7 cm. high.) | 2½ | 1½ | 3¾ | 1¼ | 2¾ | 1¼ |
| Hours taken to dust-dryness (according to Sanderson at 20°C., 65% relative humidity, film 200μ thick) | 15 | 11 | 23 | 17 | 27 | 13 |
| Transparency of film on plate glass | Clear | (¹) | (¹) | (²) | (³) | (³) |

¹ Trace of turbidity.
² Slightly turbid.
³ Very turbid, matt.

EXAMPLE 3

100 parts each of the liquid epoxy resin described in Example 1 (viscosity: 9000 centipoises at 25° C.; containing 5.3 epoxide equivalents per kg. [resin A]) are mixed at room temperature with 50 parts of polypropylene glycol having an average molecular weight of 425 (Specimen 2) and with 50 parts of ε-caprolactone (Specimen 3) as flexibilizer. These mixtures are melted with phthalic anhydride as curing agent at 120 to 130° C., using per 1 equivalent of epoxide groups in each case 0.85 equivalent of anhydride groups.

The casting resin mixtures obtained in this manner are cast in aluminum moulds (as described in Example 1) and each casting is cured for 24 hours at 140° C. The viscosity, measured at 25° C., of the epoxy resin+flexibilizer mixtures, the development of the viscosity of the uncured casting resin mixtures and the tensile strength and ultimate elongation of the cured casting resin mixtures are compiled in the following table. For comparison also the values relevant to resin A (Specimen I) cured under identical conditions except for the omissions of the flexibilizer are given.

| Specimen | Parts of Resin A | Parts of polypropylene glycol | Parts of caprolactone | Viscosity of mixture of epoxy resin and flexibilizer at 25° C., in centipoises | Viscosity of mixture of resin+flexibilizer+curing agent, at 120° C., in centipoises, after— | | | | Tensile strength, kg./mm.² | Ultimate elongation, in percent |
| --- | --- | --- | --- | --- | --- | --- | --- | --- | --- | --- |
| | | | | | 50 mins. | 100 mins. | 130 mins. | 180 mins. | | |
| 1 | 100 | 0 | 0 | 9,000 | 25 | 40 | 50 | Gelled. | 4.0 | 0.5 |
| 2 | 100 | 50 | 0 | 700 | 40 | 80 | 300 | ___do___ | 6.4 | 3.9 |
| 3 | 100 | 0 | 50 | 170 | 15 | 15 | 50 | ___do___ | 6.6 | 6.5 |

A further test is performed (Specimen 3), the mixture being cast on plates of glass in layers about 0.1 and about 1 mm. thick and cured for 24 hours at 140° C. The cured films display excellent adhesion to the base and withstand 1 hour's immersion in 2 N-sulfuric acid, 2 N-sodium hydroxide solution, acetone, chlorobenzene and water.

EXAMPLE 4

The following mixtures are prepared at room temperature from 100 parts each of the epoxy resin A (which is liquid at room temperature) and the under-mentioned ingredients:

Specimen 1: 30 parts of γ-methyl-ε-caprolactone
Specimen 2: 30 parts of a mixture of isomeric methyl-caprolactones (obtained in known manner by oxidation with peractic acid of a commercial mixture of methylcyclohexanone)
Specimen 3: 30 parts of a mixture of β-methyl-ε-caprolactone and δ-methyl-ε-caprolactone (prepared in known manner from 3-methyl-cyclohexanone with the aid of peracetic acid)
Specimen 4: 30 parts of ε-methyl-ε-caprolactone
Specimen 5: 30 parts of octanolide-(8:1)
Specimen 6: contains no additive.

10 parts of triethylene tetramine as curing agent were admixed with each of the above 6 specimens at room temperature.

To measure the ultimate elongation the above specimens of casting resin were cast in individual aluminum molds and cured for 14 hours at 40° C., as described in Example 1.

Specimen: Ultimate elongation of the cured-casting resin mixtures in percent
1 _____ 34
2 _____ 44
3 _____ 46
4 _____ 45
5 _____ 25
6 _____ 1.6

EXAMPLE 5

100 parts of the epoxy resin A (which is liquid at room temperature and has been described in Example 1) are mixed with 50 parts of dodecanolide-(12:1) at room temperature (Specimen 1).

This mixture is fused with phthalic anhydride as curing agent at 120 to 130° C. using for every equivalent of epoxide groups 0.85 equivalent of anhydride groups. The resulting casting resin mixture is cast in aluminum moulds (see Example 1) and cured for 24 hours at 140° C. The tensile strength values and the ultimate elongation of cured casting resin mixture are shown in the following table.

For comparison, the table shows also the values relevant to resin A (Specimen 2) which has been cured under identical conditions except for the omission of dodecanolide.

| Specimen | Tensile strength, kg./mm.² | Ultimate elongation in percent |
| --- | --- | --- |
| 1 | 4.8 | 4.2 |
| 2 | 4.0 | 0.5 |

EXAMPLE 6

At room temperature, 100 parts of the liquid epoxy resin described in Example 1 (resin A) are mixed with 50 parts of ε-caprolactone [Specimen 1] and with 50 parts of γ-butyrolactone [Speciman 2]. The mixtures are fused at 120° C. with phthalic anhydride as curing agent, using for every equivalent of epoxide groups 0.85 equivalent of anhydride groups. These mixtures of impregnating resin are evacuated for 15 minutes at 120° C. under a vacuum of 5 mm. Hg and then cured for 24 hours at 120° C. under atmospheric pressure.

These conditions are those which are usually employed for impregnating electrical coils, the impregnation with the fused resin being carried out in an evacuated vessel, after which the impregnated coils are cured in the usual manner under atmospheric pressure.

The following table shows the behavior of the materials during evacuation, the gel time at 120° C. of the uncured mixtures of impregnating resin, and the flexural strength and impact strength of the cured mixtures of impregnating resin:

| Specimen | Behaviour during evacuation at 120° C. under 5 mm. Hg pressure | Gel time at 120° C. in mins. | Flexural strength, kg./cm.² | Impact, cm.-kg./cm.² |
| --- | --- | --- | --- | --- |
| 1 | Perfect | 190 | 9.2 | Above 24. |
| 2 | Strong blistering | 300 | 4.3 | Do. |

What is claimed is:
1. A curable composition consisting essentially of
   (1) a 1,2-epoxy compound having a 1,2-epoxy equivarency greater than 1;
   (2) a curing agent for said 1,2-epoxy compound; and
   (3) as flexibilizer a lactone of the formula

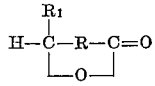

in which R is a member selected from the group consisting of straight chain alkylene radicals of 4 to 10 carbon atoms and branched alkylene radicals of 4 to 10 carbon atoms in which the side chains are methyl groups with the proviso that the lactone ring contains 7 to 13 atoms, and $R_1$ is a member selected from the group consisting of hydrogen atom and alkyl of 1 to 4 carbon atoms.

2. A curable composition consisting essentially of
   (1) a 1,2-epoxy compound having a 1,2-epoxy equivarency greater than 1;
   (2) a polycarboxylic acid anhydride as curing agent for said 1,2-epoxy compound;
   (3) as flexibilizer a lactone of the formula

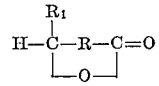

in which R is a member selected from the group consisting of straight chain alkylene radicals of 4 to 10 carbon atoms and branched alkylene radicals of 4 to 10 carbon atoms in which the said chains are methyl groups with the proviso that the lactone ring contain 7 to 13 atoms, and $R_1$ is a member selected from the group consisting of hydrogen atom and alkyl of 1 to 4 carbon atoms.

3. A curable composition consisting essentially of
(1) a 1,2-epoxy compound having a 1,2-epoxy equivarency greater than 1;
(2) a polyamine as curing agent for said 1,2-epoxy compound;
(3) as flexibilizer a lactone of the formula

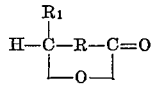

in which R is a member selected from the group consisting of straight chain alkylene radicals of 4 to 10 carbon atoms and branched alkylene radicals of 4 to 10 carbon atoms in which the side chains are methyl groups with the proviso that the lactone ring contains 7 to 13 atoms, and $R_1$ is a member selected from the group consisting of hydrogen atom and alkyl of 1 to 4 carbon atoms.

4. A curable composition consisting essentially of
(1) a 1,2-epoxy compound having a 1,2-epoxy equivarency greater than 1;
(2) a curing agent for said 1,2-epoxy compound; and
(3) as flexibilizer ε-caprolactone.

References Cited by the Examiner
UNITED STATES PATENTS

| | | | |
|---|---|---|---|
| 2,982,752 | 5/61 | Phillips et al. | 260—42 |
| 3,064,008 | 11/62 | Phillips et al. | 260—343 |

FOREIGN PATENTS 878,750  10/61  Great Britain.

MORRIS LIEBMAN, *Primary Examiner.*